United States Patent [19]
Davidson

[11] Patent Number: 6,148,841
[45] Date of Patent: Nov. 21, 2000

[54] HIGH PRESSURE GAS VALVE

[76] Inventor: Gilbert Davidson, 9205 Huntcliff Trace, Atlanta, Ga. 30350

[21] Appl. No.: 09/349,924

[22] Filed: Jul. 8, 1999

[51] Int. Cl.$^7$ .................................................. F16K 17/40
[52] U.S. Cl. ...................... 137/68.23; 137/886; 251/214; 251/215
[58] Field of Search .............................. 137/68.19, 68.23, 137/881, 886; 251/214, 215

[56] References Cited

U.S. PATENT DOCUMENTS

| | | | |
|---|---|---|---|
| 3,851,853 | 12/1974 | Teeters | 251/214 |
| 4,479,513 | 10/1984 | Koch et al. | 251/214 |
| 4,782,861 | 11/1988 | Ross | 137/886 |
| 5,503,180 | 4/1996 | Nimberger | 251/215 |
| 5,832,947 | 11/1998 | Niemczyk | 137/68.23 |

*Primary Examiner*—Gregory L. Huson
*Assistant Examiner*—Ramesh Krishnamurthy
*Attorney, Agent, or Firm*—Kyle S. Brant

[57] ABSTRACT

A post valve for use with a source of high pressure gas is disclosed. The post valve includes a body having an inlet aperture extending therethrough. The body further includes an outlet aperture in fluid communication with the inlet aperture. A stem having external threads is rotatably inserted into the body aperture and engages mating threads within the body. A fluid seal disposed about the stem prevents fluid flow past the stem. A threaded bonnet is disposed over the stem and mates with another threaded portion within the body. The threads of the stem are of different pitch than the bonnet. The fluid seal is situated so that fluid flowing into the inlet aperture and out the outlet aperture does not contact the threaded portions of the stem or body. The valve further includes a safety vent aperture in fluid communication with the inlet aperture and a high pressure rupture device that vents air pressure through the safety vent when the pressure within the inlet aperture exceeds a predetermined safety threshold pressure. Disposed at the inner end of the stem is a tip seal that provides a fluid flow seal between the inlet and the outlet apertures when the stem is fully rotated into the body. The stem further includes a radially protruding portion that prevents the stem from being rotated and simultaneously removing the bonnet portion from the valve.

19 Claims, 3 Drawing Sheets

HIGH PRESSURE GAS VALVE

FIELD OF THE INVENTION

This invention relates in general to devices used with high pressure gases and more specifically to high pressure valves for use in the medical gas industry.

BACKGROUND OF THE INVENTION

A widely used system of supplying medical oxygen to patients with impaired respiratory tracts, but who desire mobility, is composed of small tanks ranging from 160 to 660 liters at pressures of 2,000 to 3,000 PSI. The tanks are equipped with a valve that is manually opened or closed and which contains an over-pressure release device, usually a rupture disk. The prior art design of the most widely used valve of this type is shown in FIG. 8. Such valves are constructed of brass or stainless steel. The combined weight of an oxygen cylinder and the valve poses a considerable burden to the elderly or the infirm who make use of these devices typically by transporting the cylinders in shoulder bags or two-wheeled carts.

The valve shown in FIG. 8 does not allow "soft" opening or pressurization. Rather, it permits high pressure oxygen to adiabatically recompress when it enters downstream regulators, which may cause rapid temperature rises that are unsafe. Such temperature rises range from 500 degrees Fahrenheit to 1,600 degrees F. Further, the threads on the operating stem are disposed in the flow path of the high pressure fast moving oxygen stream which permits particulates generated by thread contact to be swept into downstream devices such as regulators. Fires have been known to occur in oxygen regulators as a result of the recompression problem of the prior art valve coupled with the presence of particulates that will combust when exposed to a pure or high oxygen environment. What is needed is an improved valve design that is light weight, requires a lower torque to operate, requires fewer components, prevents particulate contamination of the gas flow, minimizes unswept internal areas, provides a "soft" or metered opening of the valve and has no metal to metal contact in the internal passages of the valve.

SUMMARY OF THE INVENTION

A high pressure valve removably attachable to a high pressure gas cylinder, according to one aspect of the present invention, comprises a body having an inlet aperture, an outlet aperture, and a stem aperture wherein the inlet aperture is in fluid communication with the stem aperture, and wherein the outlet aperture is in fluid communication with the stem aperture, and wherein the body includes a first threaded portion formed in the stem aperture and a second threaded portion formed in the stem aperture and wherein the first and the second threaded portions are coaxially aligned, means for fluidly coupling the inlet aperture of the body to the high pressure gas cylinder, a stem having a cylindrical cross-section and including a handle end and a seal end, the stem further including an external threaded portion formed in the lateral cylindrical surface of the stem and matable with the first threaded portion of the body, the stem also including an annular channel in the lateral cylindrical surface of the stem, the annular channel disposed between the external threaded portion of the cylindrical stem and the seal end of the stem, and wherein the stem is rotatably insertable into the stem aperture of the body so that the external threaded portion of the stem engages the threaded portion of the stem aperture, and wherein the seal end of the stem prevents fluid flow between the inlet aperture and the stem aperture when the stem is fully rotatably inserted into the stem aperture of the body, seal means disposed in the annular channel of the stem for providing a fluid seal between the stem and the stem aperture of the body, and a bonnet having a cylindrical cross-section and a bonnet aperture therethrough, the bonnet including an external threaded portion matable with the second threaded portion of the stem aperture, and wherein the bonnet is disposed over the stem so that the handle end of the stem protrudes through the bonnet aperture and wherein the bonnet is rotatably inserted into the stem aperture with the external threaded portion of the bonnet engaging the second threaded portion of the stem aperture.

One object of the present invention is to provide an improved gas valve for use in the medical gas industry.

Another object of the present invention is to provide a reduced weight gas valve having less than half the weight of the prior art valves.

Yet another object of the present invention is to provide a medical gas valve that reduces the likelihood of introducing contaminants into the gas flow passages.

Still another object of the present invention is to provide a safety pressure release mechanism so that high pressure gas is vented to the atmosphere when the valve is being removed from a source of high pressure.

These and other objects of the present invention will become more apparent from the following description of the preferred embodiment and the accompanying drawings.

DESCRIPTION OF THE PREFERRED EMBODIMENT

Figure 1:
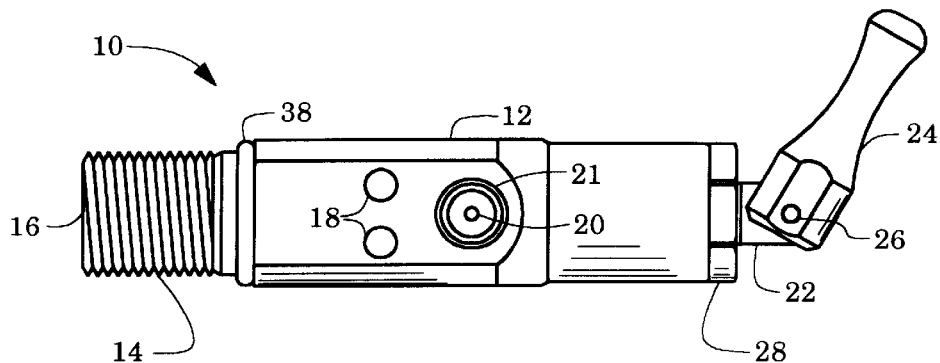
FIG. 1 is a front elevational view of the gas valve according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
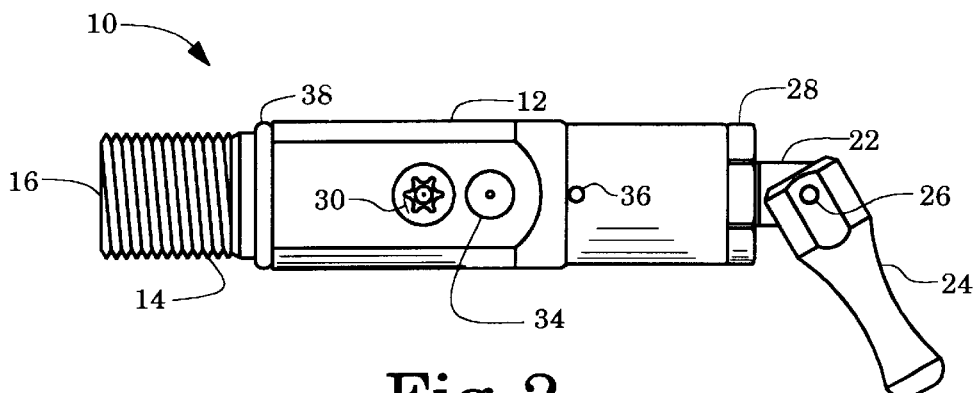
FIG. 2 is a rear elevational view of the gas valve of FIG. 1.

Referring now to FIGS. 1 and 2, a gas valve 10 for use in the medical industry, according to the present invention, is shown. FIG. 1 is a front elevational view and FIG. 2 is a rear elevational view of valve 10. Valve 10 includes a body 12 that has a threaded portion 14 adapted to mate with the internal threads of a high pressure gas source, such as a compressed gas cylinder (not shown). Compressed gas enters valve 10 at inlet passage 16 (shown in more detail in FIG. 3). Body 12 also includes dowel pin locating apertures 18. Apertures 18 receive dowel pins (not shown) that act as locating devices for alignment of a gas regulator device (not shown) that attaches to valve 10. An example of such a gas regulator and flow control device is shown in my copending application, Ser. No. 09/213,441 filed Dec. 18, 1998. The separation distance between apertures 18 is defined by Compressed Gas Association (CGA) industry standards. Adjacent to apertures 18 is the outlet passage 20. Surrounding the outlet passage 20 is a circular groove 21 having a substantially square cross-section (as sown in FIG. 3) and useful in receiving and locating a seal device that is a part of gas regulators well known in the medical gas industry and constructed according to CGA standards. Outlet passage 20 is located in accordance with the position of apertures 18, also in accordance with CGA standards. Stem 22 is rotatably inserted into the interior of body 12 and provides a mechanism that enables or restricts air flow from inlet passage 16 to outlet passage 20. Handle 24 is pivotally attached to stem 22 via pin 26. Bonnet 28 retains stem 22 within the valve body 12. Bonnet 28 includes external threads 28a (see FIG. 3) that mate with internal threads 47 of body 12. Disposed within threaded aperture 30 is a threaded plug 32 that secures an over-pressure rupture disk 33 (shown in FIG. 3). Aperture 34 is conical in cross-section and designed to receive the conical tip of a t-handle of a CGA industry standard gas regulator. Safety vent aperture 36 provides a high pressure gas flow path from within body 12 to vent any gas remaining in the body 12 before threads 46 of stem 22 are completely disengaged from threads 48 of body 12. Further, gas escaping from aperture 36 warns the user that pressurized gas is present within body 12 (and in the cylinder to which valve 10 is attached) before stem 22 becomes a projectile. A seal 38 (preferably an o-ring seal) is disposed about body 12 adjacent the threaded portion 14 to provide a gas seal between the high pressure gas cylinder (not shown) and device 10.

Operationally speaking, device 10 is attached at threaded end 14 to a high pressure gas source such as a compressed gas cylinder (not shown). Handle 24 and stem 22 are rotated clockwise to seal off the internal flow passage (shown in FIGS. 3 and 4) prior to attachment of device 10 to the gas cylinder. Once device 10 is attached to a gas cylinder, handle 24 and stem 22 are rotated counter-clockwise and the internal flow passage is opened thereby enabling gas flow from the high pressure inlet aperture 16 to the outlet aperture 20.

Figure 3:
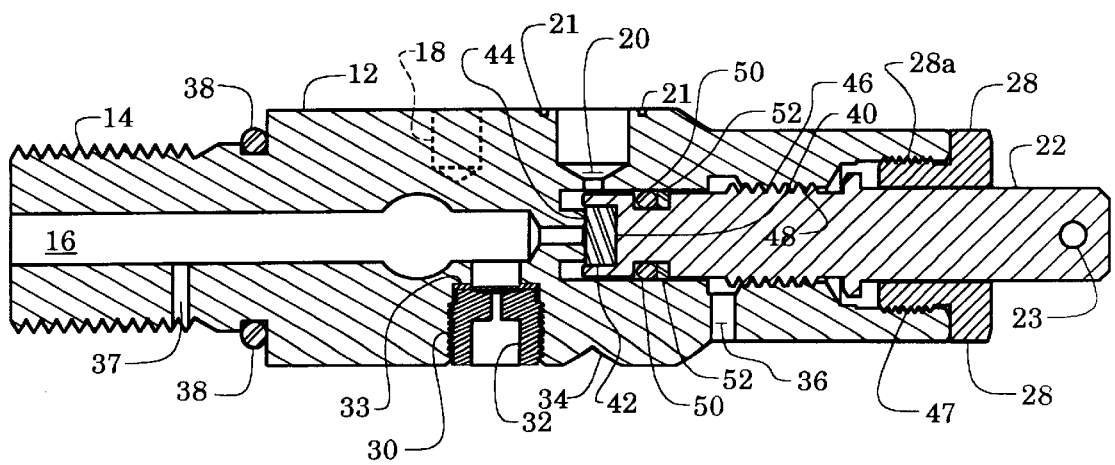
FIG. 3 is a cross-sectional view of the gas valve of FIG. 1 with the actuator lever removed and the stem in a "shut-off" position.
Figure 4:
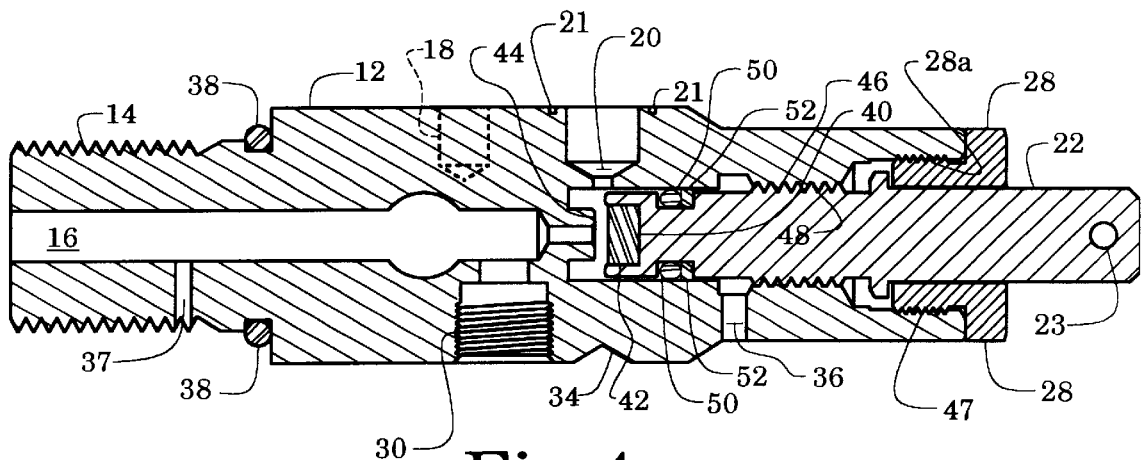
FIG. 4 is another cross-sectional view of the gas valve of FIG. 1 with the stem positioned in the "open" position.
Figure 4A:
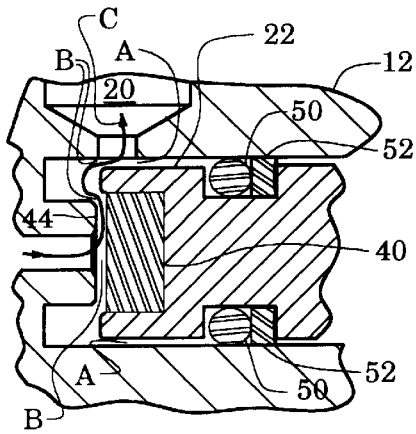
FIG. 4a is an enlarged partial cross-sectional view of the valve 10 of FIG. 4 depicting the clearance between stem 22 and body 12.

Referring now to FIGS. 3 and 4, a cross-sectional view of valve 10 with handle 24 removed, according to the present invention, is shown. FIG. 3 depicts the valve 10 in the "shut-off" or "closed" position and FIG. 4 depicts the valve 10 in the "open" position. Plug 32 and rupture disk 33 are not shown in FIG. 4. Features shown in FIGS. 3 and 4 previously discussed in regard to FIGS. 1 and 2 include body 12, threaded portion 14, inlet gas passage 16, dowel pin aperture 18, outlet passage 20, circular groove 21, stem 22, plug 32, conical aperture 34, vent aperture 36, seal 38, and bonnet 28. Stem 22 includes an ACME threaded portion 46 that engages mating internal threads 48 formed in body 12. Stem 22 also includes an aperture 23 through which pin 26 (shown in FIG. 1) pivotally attaches handle 24 (shown in FIG. 1 and 2) to stem 22. Body 12 includes an aperture or inlet passage 16 that is in fluid communication with an aperture or outlet passage 20 when stem 22 is rotated counter-clockwise urging stem 22 outward from within body 12 or when stem 22 is removed from within body 12. Stem 22 fits closely, without making contact as shown in FIG. 4a, into the inner diameter of body 12 and provides a "soft" opening and closing of the valve 10 since flow is restricted until the stem 22 is sufficiently withdrawn from within body 12. Upon clockwise rotational insertion of stem 22 into body 12, and as shown in FIG. 3, seal insert 40, disposed in a cylindrical aperture 42 at one end of stem 22, is urged into contact with circular landing 44. Aperture 16 extends through landing 44. As stem 22 is rotated clock-wise and urged into body 12, seal 40 is pressed firmly against landing 44 and gas flow from passage 16 to outlet passage 20 is interrupted. When stem 22 is rotated counterclockwise, seal 40 is urged away from landing 44 and gas is gradually allowed to pass from inlet passage 16 to outlet passage 20 as stem 22 is retracted.

O-ring seal 50 and back-up ring 52 are disposed in an annular groove 54 of stem 22. Seal 50 provides a gas seal between body 12 and stem 22 and also serves to prevent metallic particulates from entering into the gas flow in outlet passage 20. Stem 22 includes a shoulder 56 that engages bonnet 28 as stem 22 is rotated counter-clockwise thereby preventing threaded portion 46 of stem 22 from disengaging threaded portion 48 of body 12 unless bonnet 28 is first removed from body 12. Threads 28a of bonnet 28 engage and mate with threads 47 of body 12. Threaded portions 28a and 47 are of different thread pitches compared with the threaded portions 46 and 48. The difference in thread pitch between threads 28a and threads 46 and 48 causes stem 22 and bonnet 28 to "lock-up" and prevents inadvertent removal of stem 22 from body 12 if stem 22 is rotated counter-clockwise in excess, providing an added safety feature in the operation of valve 10.

Safety vent aperture 36 provides a high pressure vent flow passage from within body 12 to prevent inadvertent removal of stem 22 while there is remaining pressure in the gas cylinder when stem 22 is being removed from within body 12 when valve 10 is connected to a source of high pressure. In order for vent aperture 36 to provide a safety vent mechanism, seal 50 uncovers aperture 36 allowing gas flow from inlet passage 16 around stem 22 and out aperture 36 before threads 46 disengage threads 48. Another safety vent aperture 37 is also shown. Safety vent 37 is in fluid communication with inlet passage 16 and provides a gas flow conduit to release excess pressure in passage 16 when the threaded portion 14 is being disengaged from the threads of a high pressure gas cylinder. Vent 37 is exposed before the threaded portion 14 disengages the compressed gas cylinder so that valve 10 will not be propelled from the gas cylinder by high pressure gases.

Plug 32, as shown in FIG. 3, captures and maintains rupture disk 33 in place in aperture 30. Aperture 30 is in fluid communication with inlet passage 16. Should the pressure in passage 16 exceed a predetermined safe limit, rupture disk 33 will be mechanically deformed and rupture, and gas pressure within passage 16 will be vented to the atmosphere through the ruptured rupture disk 33.

Referring now to FIG. 4a, an enlarged partial cross-section of the valve 10 as shown in FIG. 4 is depicted. The purpose of this enlarged view is to detail the clearance in the area indicated at A between stem 22 and body 12 within valve 10. Stem 22 and body 12 are machined or formed so that no physical contact takes place between stem 22 and body 12 beyond threaded portions 46 and 48 in the area designated A. Seal 50 and back-up ring 52 prevent fine metal particles (or contaminants) that are created by the contact between threaded portions 46 and 48 from contaminating the gas that flows from inlet passage 16 and out outlet passage 20 along the flowpath designated C. Further, restricted flow areas designated B are indicated in FIG. 4a. Restricted flow areas B gradually enlarge in size as stem 22 and seal 40 are removed from landing 44. The gradual enlargement of the restricted flow areas B provides the "soft-open" operation of valve 10 first discussed above wherein valve 10 is slowly opened to allow gas flow therethrough as compared with the prior art design shown in FIG. 8.

Figure 5:
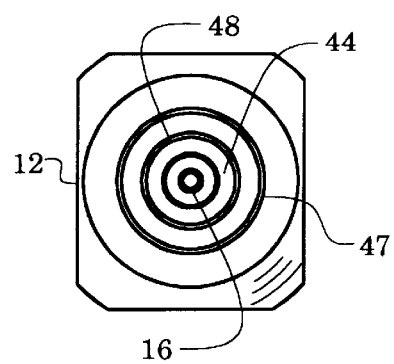
FIG. 5 is an end view of the gas valve body of FIG. 1.

Referring now to FIG. 5, an end view of body 12 is shown depicting threaded portion 47, threaded portion 48 and cylindrically shaped landing 44. Inlet passage 16 is also shown centered about landing 44.

Figure 6:
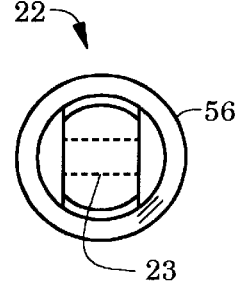
FIG. 6 is an end view of the stem shown in FIG. 1.
Figure 7:
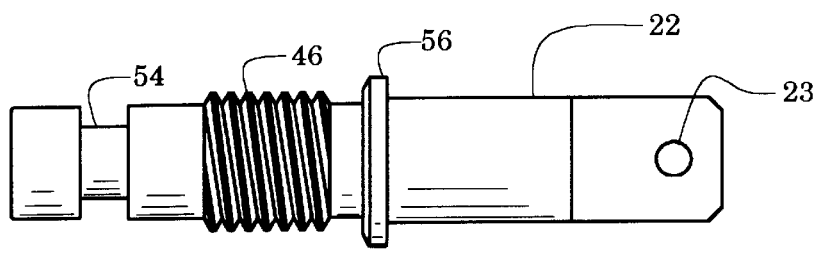
FIG. 7 is a front elevational view of the stem of FIG. 1.

Referring now to FIGS. 6 and 7, stem 22 is shown in more detail. Stem 22 includes a shoulder portion 56 that extends outward from the substantially cylindrical stem 22. Stem 22 also includes annular groove 54, threaded portion 46 and pin aperture 23.

Preferably, body 12, handle 24 and stem 22 are made from anodized aluminum to provide a light-weight valve. The surfaces of body 12 and stem 22 are anodized and impregnated using a Teflon® penetrated hard coat anodizing process, also known as Nituff®, to reduce friction between the threads and minimize metal particulate formation. The Nituff® surface also reduces rotational torque required to rotate stem 22, thereby providing a more convenient valve for use by the elderly or infirm. Body 12 and stem 22 may also be constructed of brass or stainless steel if weight savings is not of primary concern in usage of the valve 10. Seal insert 50 is made from engineering plastics such as Delrin®, Nylon®, Teflon® or the like.

Figure 8:
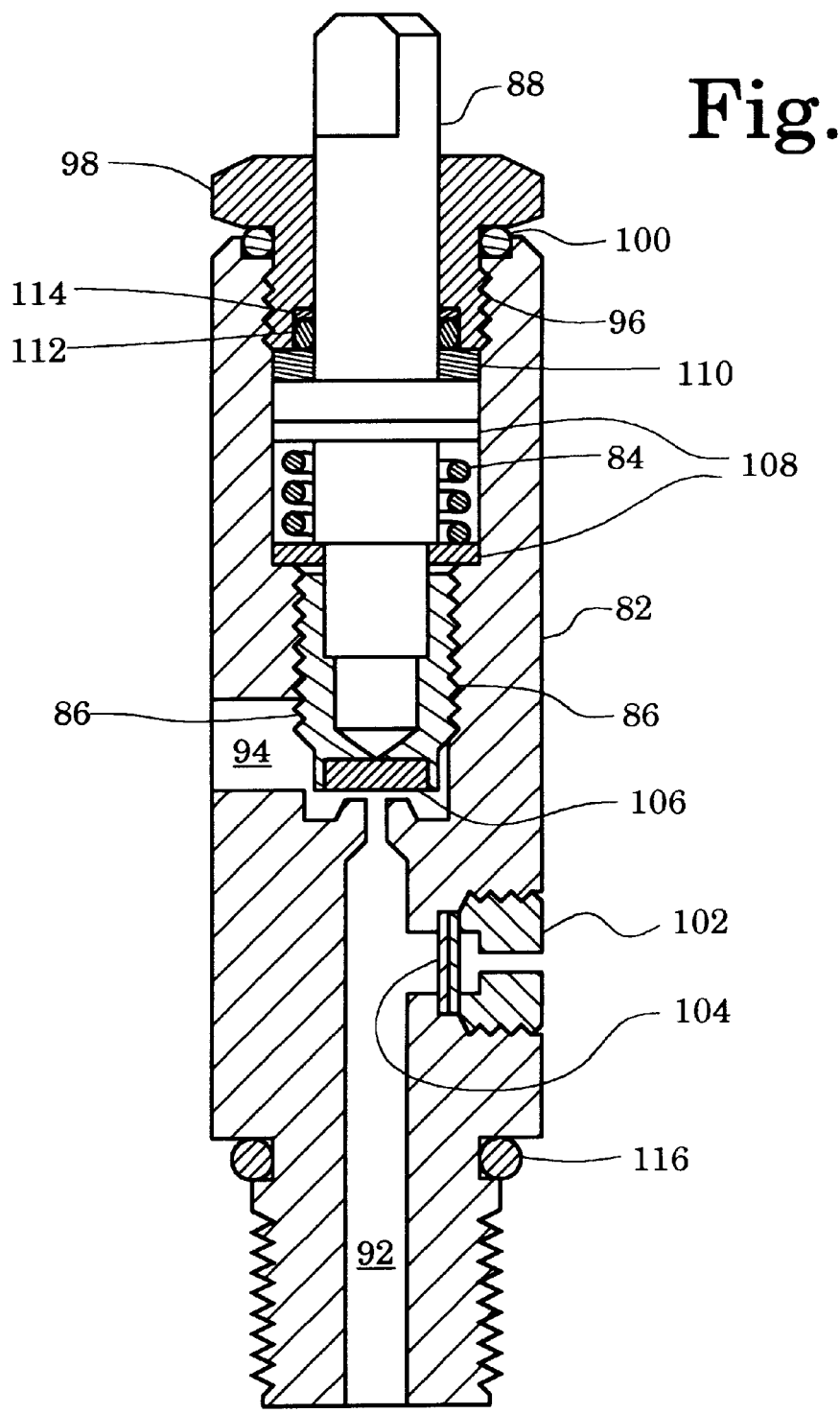
FIG. 8 is a cross-sectional view of a gas valve of the prior art.

When compared with the prior art valve 80, shown in FIG. 8, a number of advantages become readily apparent in the valve 10 disclosed herein. Body 82 is typically constructed from brass or stainless steel resulting in a much heavier valve compared with body 12 and stem 22 which are constructed from aluminum. Spring 84 causes additional frictional forces on threads 86 thereby increasing rotational torque requirements for stem 88 versus torque required to rotate stem 22. Further, threads 86 are in the flow path of gas as it travels from inlet passage 92 to and through outlet passage 94. Metal particles from threads 86 will propagate downstream to regulator devices attached to valve 80 contaminating the gas flow. Further, threads 86 and threads 96 are the same thread pitch, and excess counter-clockwise rotation of stem 88 could result in inadvertent removal of bonnet 98 from body 82. Additionally, the prior art valve 80 requires a packing washer 100, packing 110 and chamber washers 108, whereas no corresponding components are required in the valve 10 according to the present invention. Other components of valve 80 include plug 102 and rupture disk 104, stem insert 106, o-ring seal 112, o-ring seal 116 and back-up washer 114.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A high pressure valve removably attachable to a high pressure gas cylinder, said valve comprising:

a body having an inlet aperture, an outlet aperture, and a stem aperture wherein said inlet aperture is in fluid communication with said stem aperture, and wherein said outlet aperture is in fluid communication with said stem aperture, and wherein said body includes a first threaded portion formed in said stem aperture and a second threaded portion formed in said stem aperture and wherein said first and said second threaded portions are coaxially aligned;

means for fluidly coupling said inlet aperture of said body to the high pressure gas cylinder;

a stem having a cylindrical cross-section and including a handle end and a seal end, said stem further including an external threaded portion formed in the lateral cylindrical surface of said stem and matable with said first threaded portion of said body, said stem also including an annular channel in the lateral cylindrical surface of said stem, said annular channel disposed between said external threaded portion of said cylindrical stem and said seal end of said stem, and wherein said stem is rotatably insertable into said stem aperture of said body so that said external threaded portion of said stem engages said threaded portion of said stem aperture, and wherein said seal end of said stem prevents fluid flow between said inlet aperture and said stem aperture when said stem is fully rotatably inserted into said stem aperture of said body;

seal means disposed in said annular channel of said stem for providing a fluid seal between said stem and said stem aperture of said body; and a bonnet having a cylindrical cross-section and a bonnet aperture therethrough, said bonnet including an external threaded portion matable with said second threaded portion of said stem aperture, and wherein said bonnet is disposed over said stem so that the handle end of said stem protrudes through said bonnet aperture and wherein said bonnet is rotatably inserted into said stem aperture with said external threaded portion of said bonnet engaging said second threaded portion of said stem aperture.

2. The device of claim 1 wherein said stem includes a radially protruding portion extending outward from the lateral cylindrical surface of said stem, said protruding portion being disposed between said external threaded portion of said stem and said handle end of said stem, and wherein said radially protruding portion contacts said bonnet and prevents further rotation of said stem when said stem is rotated in a counterclockwise direction with respect to said body.

3. The device of claim 2 including seal means disposed at said seal end of said stem for providing a fluid seal within said stem aperture and preventing fluid flow between said inlet aperture and said stem aperture when said stem is rotatably disposed in a first position within said stem aperture so that said external threaded portion of said stem engages said first threaded portion of said body, and wherein said seal means allows fluid flow from said inlet aperture into said stem aperture when said stem is rotatably disposed in a second position within said stem aperture.

4. The device of claim 3 wherein said body includes a pressure release aperture in fluid communication with said inlet aperture of said body, and further including means for releasing excess fluid pressure disposed in and sealing said pressure release aperture, said means for releasing establishing a pressure discharge fluid conduit to ambient surroundings when the fluid pressure within said inlet aperture exceeds a predetermined limit.

5. The device of claim 4 wherein said stem includes a seal receiving aperture in said seal end of said stem and wherein said seal means is disposed in said seal receiving aperture.

6. The device of claim 5 wherein said seal means is made from engineering plastic.

7. The device of claim 6 wherein said first threaded portion and said second threaded portion of said stem aperture have thread pitches of different dimensions.

8. The device of claim 7 wherein said means for releasing excess fluid pressure is a rupture disk fixedly mounted in said pressure release aperture.

9. The device of claim 8 wherein said body includes a tank thread portion situated about said inlet aperture and matably connectable to the high pressure gas cylinder.

10. The device of claim 9 wherein said body includes a safety vent aperture in fluid communication with ambient air and said stem aperture, and wherein said annular seal traverses said safety vent aperture enabling fluid flow from said stem aperture to said safety vent aperture before said external threads of said stem disengage said first threaded portion of said body.

11. A high pressure valve comprising:
   an elongated body having a first end and a second end, a first fluid passage extending through said body from said first end to said second end, a second fluid passage in fluid communication with said first fluid passage, and wherein said first fluid passage includes a first internal threaded portion;
   an elongated member disposed within said first fluid passage of said elongated body at said first end of said body, said elongated member including an external threaded portion engaging said first internal threaded portion of said body, and wherein said elongated member prevents fluid flow from said first fluid passage to said second fluid passage when rotatably positioned into a first depth position within said body, said elongated member allowing fluid flow from said first fluid passage to said second fluid passage when rotatably positioned at a second depth position within said body;
   seal means disposed about said elongated member and providing a fluid seal between said elongated member and said elongated body, and wherein said seal means further prevents fluid flow from said first fluid passage over said external threaded portion of said elongated body; and
   means for fluidly coupling said first fluid passage to a source of high pressure at said second end of said elongated body.

12. The device of claim 11 wherein said elongated member is substantially cylindrical in cross-section and wherein said elongated member includes an annular groove adjacent said external threaded portion, and wherein said seal means is disposed in said annular groove.

13. The device of claim 12 wherein said first fluid passage of said elongated body includes a second internal threaded portion coaxially aligned with said first internal threaded portion, said device further including a plug having an external thread matable with said second internal threaded portion and engaging therewith, said plug having an aperture therethrough with said elongated member extending therethrough.

14. The device of claim 13 wherein said elongated member includes a radially protruding portion extending outward from the surface of said elongated member and disposed so that said radially protruding portion abuts said plug when said elongated member is rotated sufficiently in one direction.

15. The device of claim 14 wherein said first internal threaded portion and said second internal threaded portion of said body have thread pitches of different dimensions.

16. The device of claim 15 wherein said elongated body includes a pressure release aperture in fluid communication with said first fluid passage of said body, said device further including means for releasing excess fluid pressure disposed in and fluidly sealing said pressure release aperture, said means for releasing establishing a pressure discharge fluid conduit to ambient surroundings when the fluid pressure within said first fluid passage exceeds a predetermined limit.

17. The device of claim 16 wherein said means for releasing excess fluid pressure is a rupture disk fixedly mounted in said pressure release aperture.

18. The device of claim 17 wherein said means for fluidly coupling is a tank thread portion in said elongated body disposed about said fluid passage at said second end of said elongated body.

19. The device of claim 18 wherein said elongated body includes a safety vent aperture in fluid communication with ambient air and said fluid passage, and wherein said seal means traverses said safety vent aperture enabling fluid flow from said fluid passage through said safety vent aperture before said external threaded portion of said stem disengages said first internal threaded portion of said elongated body.

* * * * *